Nov. 17, 1953

G. S. LAWSON ET AL 2,659,477

ENDLESS CONVEYER SYSTEM

Filed Jan. 18, 1950

INVENTORS.
GEORGE S. LAWSON
BY JAMES C. LAWSON

William Isler
ATTORNEY.

Nov. 17, 1953     G. S. LAWSON ET AL     2,659,477
ENDLESS CONVEYER SYSTEM

Filed Jan. 18, 1950     2 Sheets-Sheet 2

INVENTORS.
GEORGE S. LAWSON
BY JAMES C. LAWSON

ATTORNEY

Patented Nov. 17, 1953

2,659,477

UNITED STATES PATENT OFFICE 2,659,477

ENDLESS CONVEYER SYSTEM

George S. Lawson, Perry, and James C. Lawson, Euclid, Ohio, assignors, by mesne assignments, to The Barr Rubber Products Company, Sandusky, Ohio, a corporation of Ohio Application January 18, 1950, Serial No. 139,264

6 Claims. (Cl. 198—203)

The present invention relates to material conveying systems generally and more particularly to a continuous conveyor system employing an endless belt.

It is the primary object of our invention to provide a conveyor which can transport material through its entire course of travel, that is, back to the loading point.

Another object of our invention is to provide an improved form of supporting structure for such a conveyor.

Still another object of our invention is to provide a conveyor of the character described which is relatively free from frictional resistance to movement, thereby permitting it to be operated with less power input.

A further object of our invention is to provide a conveyor of the character described, which is easily adaptable to various material handling situations.

Other objects and advantages of the invention will be apparent during the course of the following description.

In the accompanying drawings, forming a part of this specification, and in which like numerals are employed to designate like parts throughout the same, Fig. 1 is a side elevation of a conveyor system embodying the features of our invention, certain parts not being shown for purposes of clarity.

Fig. 6 is a detail cross-sectional view of the conveyor belt showing the mounting of the article holder thereon.

Figure 1:
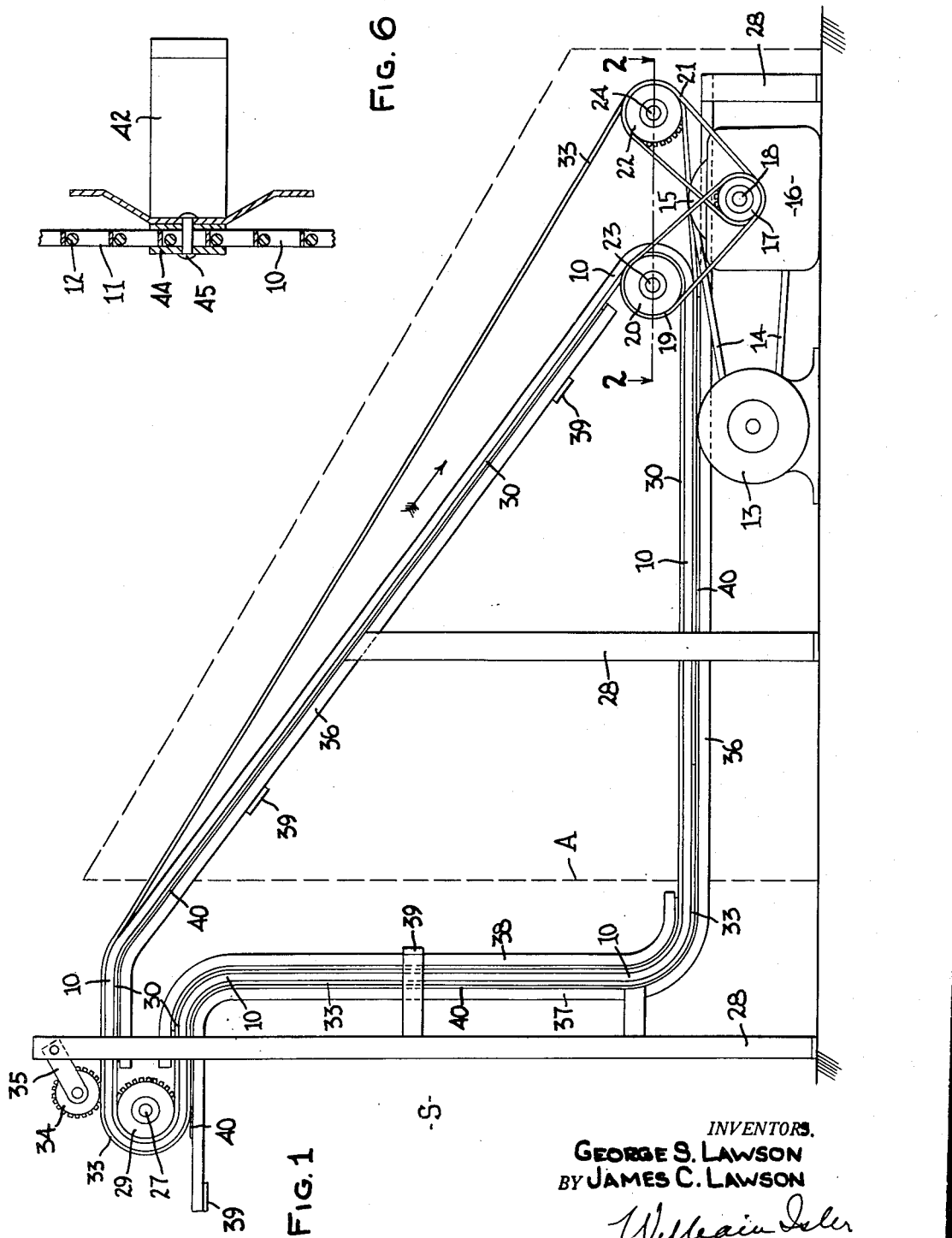

Referring more particularly to the drawings, we have illustrated in Fig. 1 a representative conveyor installation embodying the features of our invention. This exemplary installation contemplates the movement of molds, for example, through a drying or curing oven A which is indicated diagrammatically in dotted outline in Fig. 1.

The loading and unloading station is in the area designated S which lies in front of a vertical course of the conveyor belt 10.

The conveyor belt 10 itself is formed of a plurality of narrow strips 11 of metal which are symmetrically bent into a zig-zag pattern in a manner to permit each strip to nest in or overlap an adjacent strip 11. Adjacent strips are pivotally secured together by a rod 12 which extends through the overlapping portions of the strips 11 in a direction normal to the path of movement of the belt 10.

Thus, when assembled, the belt 10 is very flexible longitudinally but is relatively rigid transversely. It will be understood that other forms or types of belts may be utilized provided that they have sufficient transverse rigidity to support the load which they are expected to carry.

It has been the customary practice to train such conveyor belts over drum pulleys, or, in the case of open mesh belts, such as herein described, to drive them directly by means of sprockets which engage the strips 11 of the belt. However, in our improved form of conveyor, the belt 10 is not driven directly by the sprockets or pulleys, but instead has what may be termed a "floating connection" therewith, as will be more fully described hereinafter.

Figure 2:
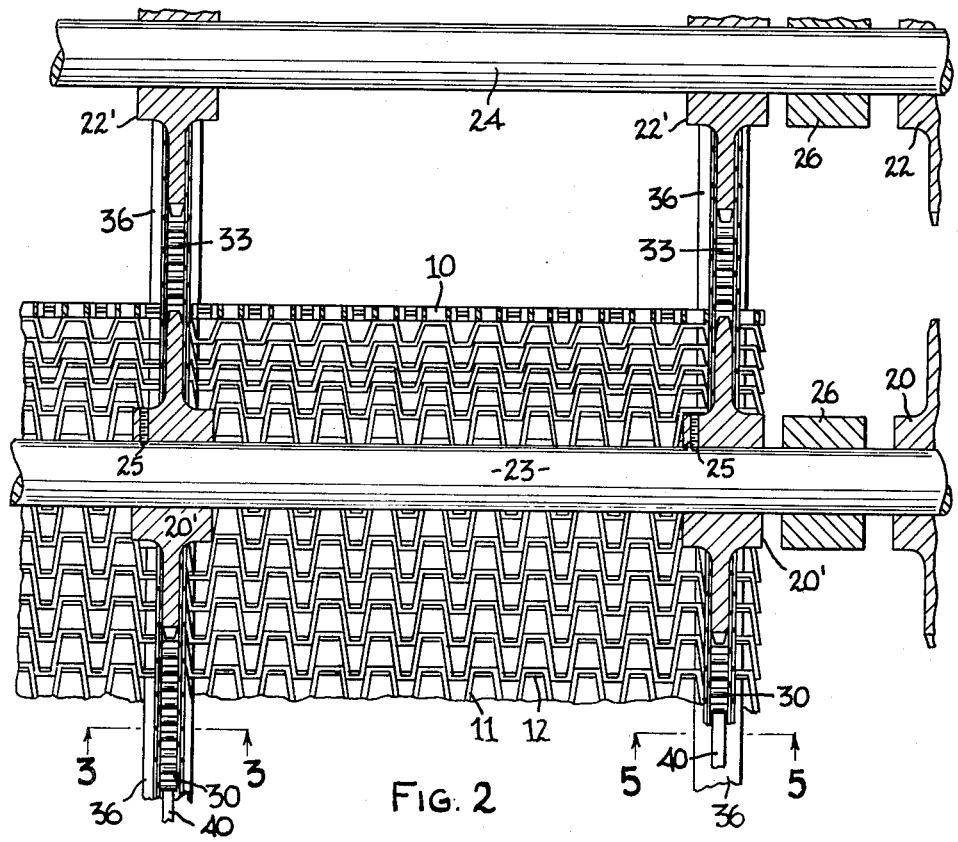
Fig. 2 is an enlarged fragmentary horizontal cross-section taken as indicated by line 2—2 of Fig. 1.

As best seen in Figs. 1 and 2, the driving mechanism for the conveyor system comprises an electric motor 13 which, by means of a V-belt 14, is connected to a pulley 15 on the high speed shaft of a speed-reducer 16.

A double sprocket 17 is secured to the output shaft 18 of the speed-reducer 16 and an endless sprocket chain 19 runs from sprocket 17 to a drive sprocket 20. A similar chain 21 runs from the other portion of double sprocket 17 to another drive sprocket 22 which is disposed rearwardly of drive sprocket 20.

The sprocket 20 is firmly secured to a drive shaft 23 and the sprocket 22 is likewise firmly secured to a similar drive shaft 24 which is parallel to shaft 23 and spaced horizontally therefrom. On shaft 23 are firmly secured, as by set screws 25, a plurality of axially spaced drive sprockets 20' and on shaft 24 are similarly secured a number of correspondingly spaced drive sprockets 22'. The number and spacing of the drive sprockets 20' and 22' is dependent upon and determined by the width of the conveyor belt, the rigidity of the belt, and the load which the belt is required to carry. For our purposes we have found that the axial distance between the sprockets may be about 18 inches. Thus three sprockets 20' and 22' would be required for a belt three feet wide, seven such sprockets would be required for a conveyor belt nine feet wide, and so forth.

Each shaft 23 and 24 is suitably supported by two pillow blocks or pedestal bearings 26 which for purposes of clarity are not shown in Fig. 1 but are indicated in Fig. 2.

Near the loading station S, a rotatable shaft 27 is provided which is supported at an overhead level by a suitable framework indicated generally by the reference character 28. For purposes of clarity of illustration, the particular shaft-supporting elements are not shown, such elements being well known in the art. On this shaft 27 are rigidly secured a plurality of idler sprockets 29 which correspond in number and spacing to the drive sprockets 20' or 22'. An endless chain 30 is trained over each drive sprocket 20' and its corresponding idler sprocket 29, there being as many chains 30 as there are sprockets 20'. The chains 30 are conventional sprocket chains having suitably spaced rollers 31 which are supported by pivotally connected side plates 32.

The flexible endless conveyor belt 10 in turn overlies the chains 30 and follows the course thereof.

A second group of endless chains 33 are trained over the drive sprockets 22' and overlie the belt 10. The chains 33 follow a course parallel to that of the chains 30, they being maintained in alignment by means of idler sprockets 34 which are pivotally supported by yokes 35 which are pivotally secured to the framework 28. Each idler sprocket 34 is co-planar with a corresponding idler sprocket 29.

It will thus be apparent that the conveyor belt 10 is sandwiched between two parallel courses of the chains 30 and 33, and during its travel it will rest upon one or the other groups of chains depending upon the direction in which it is traveling.

In order to provide rigid support for the conveyor belt 10 and the chains 30 and 33, as well as to guide the chain in the desired path of travel, longitudinally extending supports 36 in the form of angle irons are provided and integrated with the framework 28. The angles 36 underlie the upper reach or course of each of the chains 30 and underlie the lower reach of each of the chains 33. The vertical course of the belt 10 is determined by suitably curved angle irons which form guides 37 and 38 on opposite sides of the belt 10 and serve to alter its direction of travel. The guides 37 are adjacent the chains 33 and the guides 38 are adjacent the chains 30. It will be understood that guides 37 and 38 are integrated with the framework 28 and that transversely extending crosspieces such as 39 are welded or otherwise secured to the supports 36 and the guides 37, 38 so as to provide a rigid, integrated framework. Obviously, the crosspieces must be so placed as not to interfere with the movement of the material which is transported by the conveyor belt 10.

Figure 3:
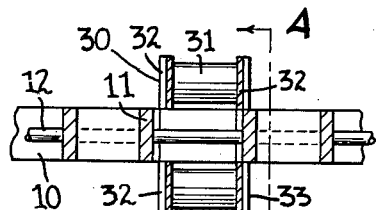
Fig. 3 is an enlarged fragmentary cross-sectional view taken on line 3—3 of Fig. 2.

On each of the supports 36 and guides 37, 38 are mounted tracks 40 which consist of narrow strips or bars of metal, such as brass, for example, which are held in place by screws 41. The tracks 40 are narrower than the distance between the opposite side-plates 32 of the chains 30 and 33 and therefore provide a surface which engages the rollers 31 of the chains. The tracks are, however, of sufficient thickness to prevent the chains from contacting the supports 36 or the guides 37, 38. This structure is best shown in Fig. 3.

From the foregoing, it will be apparent that there is no direct connection between the conveyor belt 10 and the drive sprockets 20' or 22', instead, the belt rests upon and is carried by the driven chains 30 and 33, there being no relative movement between the belt and the chains. The chains 30 and 33 in turn roll upon the tracks 40 which in turn are mounted on the supports 36 or guides 37 and 38 thus serving to support the belt and chains at suitably spaced positions.

Several advantages result from such a construction. In the first place, a solid bed-plate or similar structure underlying the belt is not required. Such bed-plates rub against the conveyor belt causing a great deal of drag or friction as well as causing a great deal of wear on the belt. Secondly, the drive sprockets do not directly engage the belt, thus alleviating an additional source of wear on the belt. And, thirdly, a complete cycle of usefulness of the belt is made possible, that is, both the upper and lower course of the belt is utilized for the movement of the material.

Thus, in the example selected, if the conveyor belt is moving in the direction indicated by the arrow in Fig. 1, the molds would be loaded on the belt at station S by inserting them in suitably formed mold supporting clips 42 which are secured to the outer surface of the belt 10 by means of cross-strips 44 and fasteners 45 as illustrated in Fig. 6. The molds and the mold clips are disclosed and described more fully in our copending application, Serial No. 118,208, filed September 28, 1949. The molds would then move upwardly with the belt 10 and go through the drying oven A. Molds which have already been through the oven will be removed from the conveyor belt as they return to station S. One operator can, if necessary both load and unload the molds, loading a wet mold in the holder 42 from which he has just removed a dried mold. The operation is thereby made truly efficient and continuous there being practically speaking, no time at which the article holders 42 are traveling empty, such as occurs in the prior art forms of belt conveyor systems.

Figure 5:
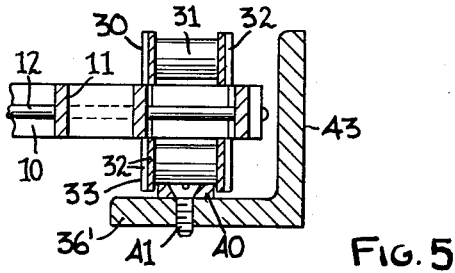
Fig. 5 is a view similar to Fig. 3 but showing a slightly modified form of the invention.
Figure 4:
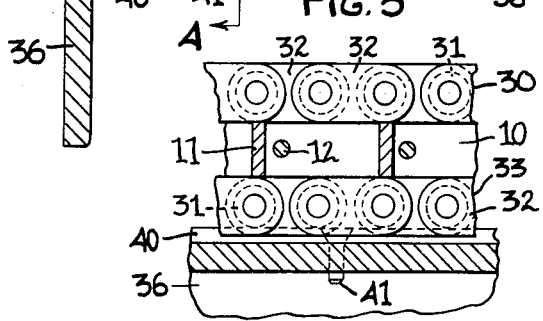
Fig. 4 is a cross-sectional view taken on line 4—4 of Fig. 3.

In Fig. 5 we have shown a slightly modified form of the invention in which the supports 36' which lie under the outside edges of the belt 10 are mounted in such a manner that one side or leg 43 of the angle iron extends vertically upwardly so as to form a side wall serving to maintain the belt in proper alignment.

Although we have particularly described the conveyor structure with reference to a mold drying operation, it will be understood that such description is illustrative only and is not to be considered as limiting the scope of our invention, and that various changes in the shape, size and arrangement of parts may be resorted to, without departing from the spirit of my invention or the scope of the subjoined claims.

Having thus described our invention, we claim:

1. In a conveyor system, the combination of horizontally spaced parallel endless roller chains, a track underlying the rollers of the upper reach of said chains, an endless conveyor belt overlying said chains coaxially thereof, driving means engaging said chains to effect movement thereof, a second group of endless roller chains overlying said conveyor belt in coplanar relationship to said first-named chains, a track underlying the rollers of the lower reach of said second-named chains, and driving means engaging said second-named chains to effect movement thereof whereby said belt is carried between said first-named and said second-named chains.

2. In a conveyor system, the combination of a plurality of transversely spaced endless roller chains, a like plurality of transversely spaced endless roller chains each being coaxial and coplanar with one of said first-named chains, a conveyor belt carried between said first-named chains and said second-named chains in coaxial relationship thereto, and driving means engaging said chains to effect travel of said conveyor belt.

3. In a conveyor system, the combination of a plurality of transversely spaced endless roller chains, a like plurality of transversely spaced endless roller chains each being coaxial and coplanar with one of said first-named chains, a conveyor belt carried between said first-named chains and said second-named chains in coaxial relationship thereto, a plurality of transversely spaced longitudinally extending supporting members underlying the lowermost of said chains whereby to support both the upper and lower reaches of said conveyor belt, and driving means engaging said chains to effect travel of said conveyor belt.

4. A combination, as defined in claim 3, wherein said supporting members have a track mounted thereon engaging the rollers of said chains, said track being of sufficient thickness to maintain said chains out of contact with said supporting members.

5. In a conveying system, the combination of a plurality of transversely spaced endless roller chains movable in a vertical plane, a like plurality of transversely spaced endless roller chains coaxial and coplanar with each of said first-named chains, a conveyor belt carried between said first-named and said second-named chains in coaxial relationship thereto, driving means engaging said chains, a plurality of transversely spaced longitudinally extending supporting members underlying the lowermost sections of each pair of coplanar chains, and a plurality of article holders secured to the surfaces of said belt which lie intermediate said supporting members whereby the articles retained in said article holders may travel the entire course of said belt.

6. A combination, as defined in claim 5, wherein said supporting members have a track mounted thereon engaging the rollers of said chains, said track being of sufficient thickness to maintain said chains out of contact with said supporting members.

GEORGE S. LAWSON.
JAMES C. LAWSON.

References Cited in the file of this patent
UNITED STATES PATENTS

| Number | Name | Date |
|---|---|---|
| 1,896,151 | Zademach | Feb. 7, 1933 |
| 2,168,852 | Webb | Aug. 8, 1939 |
| 2,386,558 | Kleintop | Oct. 9, 1945 |
| 2,549,729 | Wallny | Apr. 17, 1951 |